United States Patent
Frövik et al.

(10) Patent No.: US 11,698,283 B2
(45) Date of Patent: Jul. 11, 2023

(54) RADAR LEVEL GAUGING USING CORNER REFLECTOR FORMED BY PRODUCT SURFACE AND TANK WALL

(71) Applicant: Rosemount Tank Radar AB, Mölnlycke (SE)

(72) Inventors: Christer Frövik, Linköping (SE); Olov Edvardsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 191 days.

(21) Appl. No.: 16/876,474

(22) Filed: May 18, 2020

(65) Prior Publication Data
US 2020/0386602 A1    Dec. 10, 2020

(30) Foreign Application Priority Data

Jun. 5, 2019 (EP) .................................... 19178327

(51) Int. Cl.
*G01F 23/284*    (2006.01)
*G01S 13/08*     (2006.01)
(Continued)

(52) U.S. Cl.
CPC ............ *G01F 23/284* (2013.01); *G01F 25/20* (2022.01); *G01S 7/003* (2013.01); *G01S 7/025* (2013.01);
(Continued)

(58) Field of Classification Search
CPC ...... G01F 23/284; G01F 25/20; G01S 7/4008; G01S 7/4021; G01S 7/4026; G01S 7/403;
(Continued)

(56) References Cited

U.S. PATENT DOCUMENTS

| 6,415,660 B1 * | 7/2002 | Sinz ..................... G01F 23/284 73/290 R |
| 8,813,559 B2 | 8/2014 | Welle et al. |

(Continued)

FOREIGN PATENT DOCUMENTS

| CA | 2 787 896 | 8/2011 |
| JP | 2005-147698 | 6/2005 |

(Continued)

OTHER PUBLICATIONS

European Search Report from European Application No. 19178327.3 dated Nov. 27, 2019.

*Primary Examiner* — Timothy A Brainard
*Assistant Examiner* — Ismaaeel A. Siddiquee
(74) *Attorney, Agent, or Firm* — Westman, Champlin & Koehler, P.A.

(57) ABSTRACT

A method carried out using a radar level gauge system, the tank having a tank roof supporting the radar level gauge system, a tank wall, and a tank atmosphere in a space defined by a surface of a product in the tank, the tank roof, and the tank wall, wherein the method comprises generating and transmitting an electromagnetic first transmit signal; propagating the first transmit signal through the tank atmosphere towards a corner reflector formed by the surface of the product and the tank wall where the surface of the product meets the tank wall, the corner reflector being at a known horizontal distance from the radar level gauge system; receiving an electromagnetic first reflection signal resulting from reflection of the first transmit signal at the corner reflector; and performing a filling level determination and/or a verification operation for the radar level gauge system based on a timing relation between the first transmit signal and the first reflection signal, and the known horizontal (Continued)

distance between the radar level gauge system and the corner reflector.

7 Claims, 6 Drawing Sheets

(51) Int. Cl.
| | |
|---|---|
| *G01S 7/40* | (2006.01) |
| *G01S 13/42* | (2006.01) |
| *G01F 25/20* | (2022.01) |
| *G01S 7/00* | (2006.01) |
| *G01S 7/02* | (2006.01) |
| *G01S 13/88* | (2006.01) |
| *G01S 13/46* | (2006.01) |
| *H01Q 1/22* | (2006.01) |

(52) U.S. Cl.
CPC .............. *G01S 7/403* (2021.05); *G01S 7/4008* (2013.01); *G01S 7/4021* (2013.01); *G01S 7/4026* (2013.01); *G01S 13/08* (2013.01); *G01S 13/426* (2013.01); *G01S 13/46* (2013.01); *G01S 13/88* (2013.01); *H01Q 1/225* (2013.01)

(58) Field of Classification Search
CPC ........ G01S 13/08; G01S 13/426; G01S 7/003; G01S 7/025; G01S 13/46; G01S 13/88; H01Q 1/225

See application file for complete search history.

(56) References Cited

U.S. PATENT DOCUMENTS

| | | | |
|---|---|---|---|
| 2004/0119635 A1* | 6/2004 | Edvardsson | G01S 13/103 73/290 R |
| 2004/0119636 A1 | 6/2004 | Edvardsson et al. | |
| 2005/0072226 A1 | 4/2005 | Pappas et al. | |
| 2014/0028492 A1 | 1/2014 | Mayer et al. | |
| 2015/0007653 A1* | 1/2015 | Fehrenbach | G01F 1/002 73/198 |
| 2015/0130650 A1 | 5/2015 | Korsbo et al. | |
| 2015/0253177 A1* | 9/2015 | Blodt | G01F 23/284 324/644 |
| 2016/0054167 A1 | 2/2016 | Welle et al. | |
| 2017/0010143 A1 | 1/2017 | Kassubek et al. | |

FOREIGN PATENT DOCUMENTS

| | | |
|---|---|---|
| JP | 6221708 | 10/2017 |
| JP | 6221708 B2 * | 11/2017 |

\* cited by examiner

RADAR LEVEL GAUGING USING CORNER REFLECTOR FORMED BY PRODUCT SURFACE AND TANK WALL

CROSS-REFERENCE TO RELATED APPLICATION

This application claims priority to European Patent Application No. 19178327.3, filed on Jun. 5, 2019, the content of which is hereby incorporated by reference in its entirety.

TECHNICAL FIELD OF THE INVENTION

The present invention relates to radar level gauging methods and systems.

TECHNICAL BACKGROUND

Radar level gauging is often used for determining the filling level of product in a tank. The filling level determination is dependent on the propagation speed of electromagnetic signals through a tank atmosphere inside the tank, above the surface of the product. At least for some applications, It may therefore be beneficial to be able to correct the determined filling level for changes in the properties of the tank atmosphere. It may also be beneficial to be able to verify a filling level determination, and/or that a radar level gauge system functions as expected.

SUMMARY

In view of the above, a general object of the present invention is to provide for improved radar level gauging.

Aspects of the present invention are based on the realization that the surface of the product in the tank and the tank wall form a corner reflector where the surface of the product meets the tank wall, and that analysis of a reflection signal resulting from reflection of a transmit signal at this corner reflector can be used to improve radar level gauging in tanks in various ways.

According to a first aspect of the present invention, it is provided a method of determining a signal propagation speed compensation factor in a tank using a radar level gauge system, the tank having a tank wall, and a tank atmosphere above a surface of a product in the tank, wherein the method comprises: generating and transmitting an electromagnetic first transmit signal; propagating the first transmit signal through the tank atmosphere towards a corner reflector formed by the surface of the product and the tank wall where the surface of the product meets the tank wall, the corner reflector being at a known horizontal distance from the radar level gauge system; receiving an electromagnetic first reflection signal resulting from reflection of the first transmit signal at the corner reflector; generating and transmitting an electromagnetic second transmit signal; propagating the second transmit signal through the tank atmosphere vertically towards the surface of the product; receiving an electromagnetic second reflection signal resulting from reflection of the second transmit signal at the surface of the product; and determining the signal propagation speed compensation factor based on a first timing relation between the first transmit signal and the first reflection signal, a second timing relation between the second transmit signal and the second reflection signal, and the known horizontal distance between the radar level gauge system and the corner reflector.

According to a second aspect of the present invention, it is provided a radar level gauge system for determining a filling level of a product in a tank having a tank wall, and a tank atmosphere above a surface of a product in the tank, wherein the radar level gauge system comprises: a transceiver for generating, transmitting and receiving electromagnetic signals; a signal propagation arrangement coupled to the transceiver for: propagating an electromagnetic first transmit signal through the tank atmosphere towards a corner reflector formed by the surface of the product and the tank wall where the surface of the product meets the tank wall, the corner reflector being at a known horizontal distance from the radar level gauge system, and returning to the transceiver an electromagnetic first reflection signal resulting from reflection of the first transmit signal at the corner reflector; and propagating an electromagnetic second transmit signal from the transceiver through the tank atmosphere towards the surface of the product and returning to the transceiver an electromagnetic second reflection signal resulting from reflection of the second transmit signal at the surface of the product; and processing circuitry coupled to the transceiver and configured to determine the filling level based on a first timing relation between the first transmit signal and the first reflection signal, a second timing relation between the second transmit signal and the second reflection signal, and the known horizontal distance between the radar level gauge system and the corner reflector.

In these aspects, the known geometry in combination with the ability to make two measurements of geometrically related distances through the tank atmospheres makes is possible to determine a signal speed compensation factor, and to determine a true filling level.

In particular, using simple geometry, the known horizontal distance can be expressed as an exemplary signal speed compensation factor times the square root of the difference between the square of the measured distance to the corner reflector and the square of the measured vertical distance to the surface. After having determined this signal speed compensation factor, the true or compensated vertical distance to the surface of the product can be determined by dividing the measured vertical distance to the surface of the product by the signal speed compensation factor.

In addition, the signal speed compensation factor may be useful for estimating the total amount of product in the vapor phase, in order to achieve an improved estimation of the total amount of product in the tank.

According to a third aspect of the present invention, it is provided a method of determining a filling level of a product in a tank using a radar level gauge system, the tank having a tank wall, and a tank atmosphere above a surface of a product in the tank, the method comprising: generating and transmitting an electromagnetic first transmit signal; propagating the first transmit signal through the tank atmosphere towards a corner reflector formed by the surface of the product and the tank wall where the surface of the product meets the tank wall, the corner reflector being at a known horizontal distance from the radar level gauge system; receiving an electromagnetic first reflection signal resulting from reflection of the first transmit signal at the corner reflector; determining a measure indicative of a propagation direction of the first reflection signal; and determining the filling level based on the measure indicative of the propagation direction of the first reflection signal and the known horizontal distance between the radar level gauge system and the corner reflector.

In this aspect, the true vertical distance to the surface of the product in the tank can be determined based on the known geometry, and a measurement of the direction of a line from a reference position at the radar level gauge system to the corner reflector formed by the surface of the product and the tank wall. The direction may, for example, be expressed as the angle of a transmit signal resulting in the strongest reflection from the corner reflector. The true vertical distance between the reference position at the radar level gauge system and the surface of the product in the tank can then be based on the determined angle and the above-mentioned known horizontal distance.

According to embodiments, the vertical distance determined based on the above-mentioned direction of a line from a reference position at the radar level gauge system to the corner reflector formed by the surface of the product and the tank wall, and the above-mentioned known horizontal distance can be compared with the uncorrected vertical distance determined using a second transmit signal propagated vertically towards the surface. Such a comparison can verify proper operation of the radar level gauge system and/or provide an indication of the reliability of the radar level gauge system.

According to a fourth aspect of the present invention, it is provided a radar level gauge system for determining a filling level of a product in a tank having a tank wall, and a tank atmosphere above a surface of a product in the tank, wherein the radar level gauge system comprises: a transceiver for generating, transmitting and receiving electromagnetic signals; a signal propagation arrangement coupled to the transceiver for: propagating an electromagnetic first transmit signal through the tank atmosphere towards a corner reflector formed by the surface of the product and the tank wall where the surface of the product meets the tank wall, the corner reflector being at a known horizontal distance from the radar level gauge system, and returning to the transceiver an electromagnetic first reflection signal resulting from reflection of the first transmit signal at the corner reflector; and propagating an electromagnetic second transmit signal from the transceiver through the tank atmosphere towards the surface of the product and returning to the transceiver an electromagnetic second reflection signal resulting from reflection of the second transmit signal at the surface of the product; and processing circuitry coupled to the transceiver and configured to: determine a first measure of the filling level based on a propagation direction of the first reflection signal and the known horizontal distance between the radar level gauge system and the corner reflector; determine a second measure of the filling level based on a timing relation between the second transmit signal and the second reflection signal; and verify operation of the radar level gauge system based on a comparison between the first measure of the filling level and the second measure of the filling level.

The tank may be any container or vessel capable of containing a product, and may be metallic, or partly or completely non-metallic, open, semi-open, or closed.

Accordingly, the tank may have a tank roof supporting the radar level gauge system, and the tank atmosphere may be in a space defined by the surface of the product in the tank, the tank roof, and the tank wall.

The "transceiver" may be one functional unit capable of transmitting and receiving electromagnetic signals or may be a system comprising separate transmitter and receiver units.

It should be noted that the processing circuitry may be provided as one device or several devices working together.

By "horizontal distance" should be understood the distance along a horizontal line between the above-defined corner reflector and a vertical line passing through a reference point of the radar level gauge system. For instance, such a reference point may be defined by an antenna of the radar level gauge system.

The horizontal distance may be assumed to be the same within the permitted filling level range of the tank, or horizontal distances may be provided as a function of an approximate filling level in the tank. Such horizontal distances may be pre-stored in memory, for example in a lookup table or similar, and may be based on previous measurements and/or on a computational model of the tank. In the case of a using a computational model of the tank, the horizontal distance(s) may be estimated based on various parameters, which may, for example, include approximate filling level, temperature, and/or a profiling of the tank wall carried out using other measurement means. For example, the tank wall may be scanned—from the inside or from the outside—when it is empty and/or at different filling levels.

According to various embodiments of the aspects of the present invention, the signal propagation arrangement may comprise a radiating antenna configured to propagate the first transmit signal in a plurality of directions in relation to a line normal to the surface of the product.

In embodiments, the radiating antenna, which may advantageously be a patch antenna, may be controllable to successively propagate transmit signals in each direction in the plurality of directions.

The first and second transmit signals may advantageously be propagated as horizontally polarized electromagnetic signals, to minimize the power that is lost when hitting the surface of the product at oblique angles.

It should be noted that embodiments and variations of the various aspects of the present invention are largely analogous.

In summary, the present invention thus relates to a method carried out using a radar level gauge system, the tank having a tank wall, and a tank atmosphere above a surface of a product in the tank, wherein the method comprises generating and transmitting an electromagnetic first transmit signal; propagating the first transmit signal through the tank atmosphere towards a corner reflector formed by the surface of the product and the tank wall where the surface of the product meets the tank wall, the corner reflector being at a known horizontal distance from the radar level gauge system; receiving an electromagnetic first reflection signal resulting from reflection of the first transmit signal at the corner reflector; and performing a filling level determination and/or a verification operation for the radar level gauge system based on a timing relation between the first transmit signal and the first reflection signal, and the known horizontal distance between the radar level gauge system and the corner reflector.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the present invention are mainly discussed with reference to a radar level gauge system with a signal propagation arrangement comprising a patch antenna controllable to direct a radiation lobe in a number of desired directions.

It should be noted that this by no means limits the scope of the present invention, which also covers a radar level gauge system with another type of signal propagation arrangement. For example, the signal propagation arrangement may comprise separate signal propagation devices for signal propagation towards the corner reflector formed where the surface of the product meets the tank wall, and for vertical signal propagation towards the surface of the product, respectively. In such cases, it may not be necessary to provide the signal propagation device for vertical signal propagation as a radiating antenna, but this signal propagation device could be provided as a transmission line probe. Furthermore, the communication interface of the radar level gauge system need not be wireless, but the radar level gauge system may configured for wired communication, for example using a 4-20 mA current loop and/or other wired means for communication.

Figure 1:
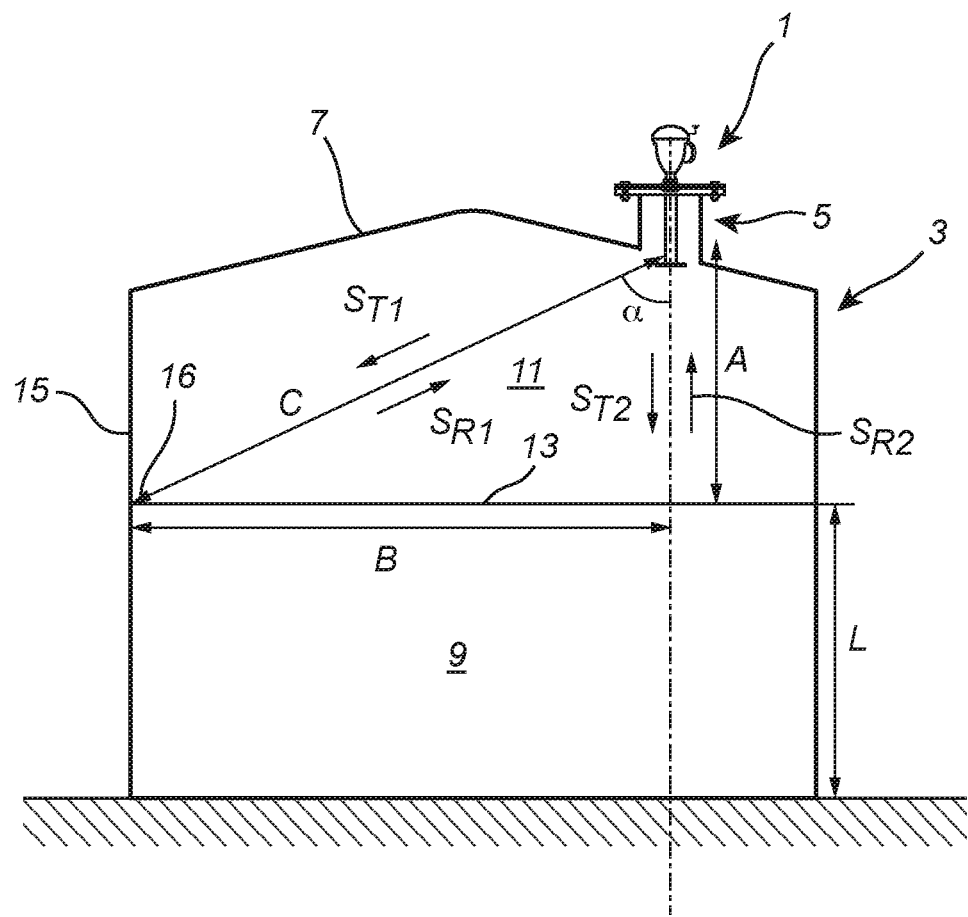
FIG. 1 schematically illustrates an exemplary tank arrangement comprising a radar level gauge system according to an embodiment of the present invention.

FIG. 1 schematically shows an exemplary radar level gauge system 1 installed at a tank 3 having a tubular mounting structure 5 (often referred to as a "nozzle") extending substantially vertically from the roof 7 of the tank 3. The tank 3 contains a product 9 to be gauged, and the is a tank atmosphere 11 in a space defined by a surface 13 of the product 9, the tank roof 7, and the tank wall 15. Additionally indicated in FIG. 1 are a corner reflector 16 formed by the surface 13 of the product 9 and the tank wall 15 where the surface 13 of the product 9 meets the tank wall 15, the vertical distance A between a reference position at the radar level gauge system 1 and the surface 13 of the product, the horizontal distance B between a vertical line through the reference position and the tank wall 15 at the corner reflector 16, and the straight-line distance C between the reference position at the radar level gauge system 1 and the corner reflector 16.

Depending mainly on the properties of the product 9 in the tank 3, the tank atmosphere 11 may influence the propagation speed of the electromagnetic transmit and reflection signals $S_{T1}$, $S_{R1}$, $S_{T2}$, $S_{R2}$. Furthermore, the tank atmosphere 11 may not have uniform propagation properties throughout, but may, for example, be stratified. In the case where the product 9 contains hydrocarbons, there may be a rather slow evaporation, and there may therefore be a stratification of the hydrocarbon vapor density in the tank atmosphere during a fairly long transition time. Such a transition time may be in the order of days. During this transition time, it may be very difficult or even impossible to correctly compensate for the change in signal propagation speed based on assumptions based on a steady state vapor concentration in the tank atmosphere 11.

Through embodiments of various aspects of the present invention, the influence of such stratification etc. can be dealt with by transmitting the first transmit signal $S_{T1}$ and the second transmit signal $S_{T2}$ along propagations paths exhibiting the same vertical stratification profile.

Figure 2:
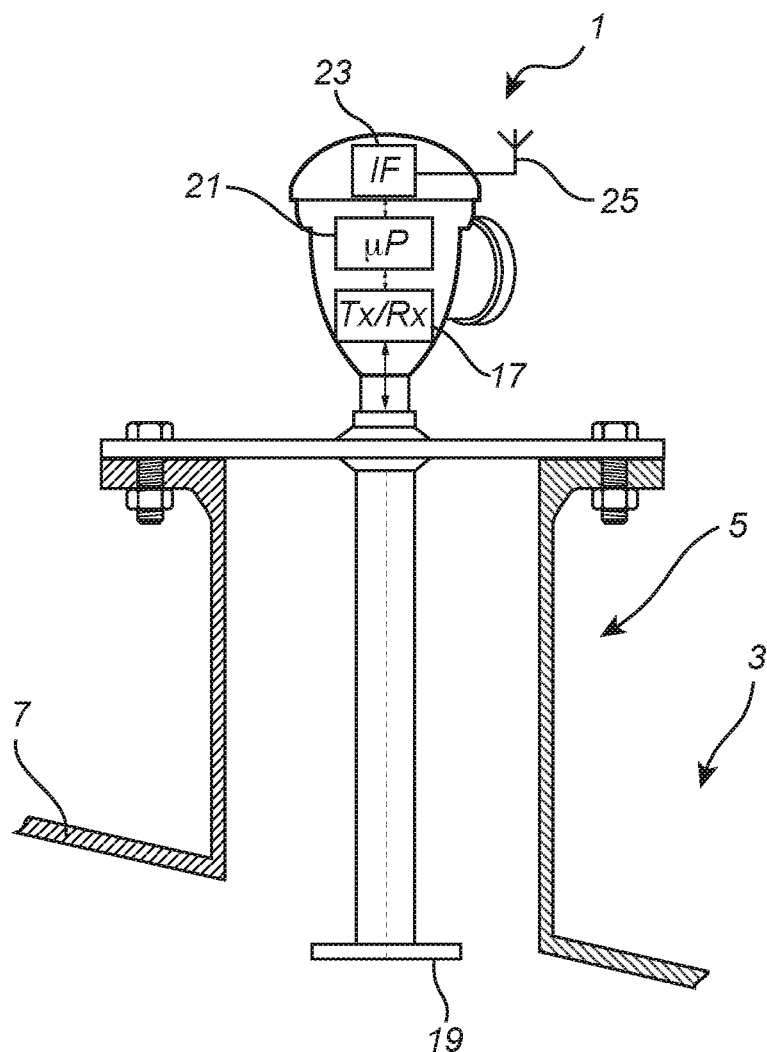
FIG. 2 is schematic illustration of the radar level gauge system in FIG. 1.

FIG. 2 is an enlarged view of the radar level gauge system 1 in FIG. 1, schematically indicating functional parts of the radar level gauge system 1. Referring to FIG. 2, the radar level gauge system 1 comprises a transceiver 17, a signal propagation arrangement, here in the form of a patch antenna 19, processing circuitry 21, a communication interface 23, and a communication antenna 25 for enabling wireless communication between the radar level gauge system 1 and an external unit, such as a control system (not shown).

In the example embodiment of FIG. 2, the communication from/to the radar level gauge system 1 is indicated as being wireless communication. Alternatively, communication may, for example, take place over an analog and/or digital wire-based communication channel. For instance, the communication channel may be a two-wire 4-20 mA loop and the filling level and/or leakage detection signal may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

Figure 3:
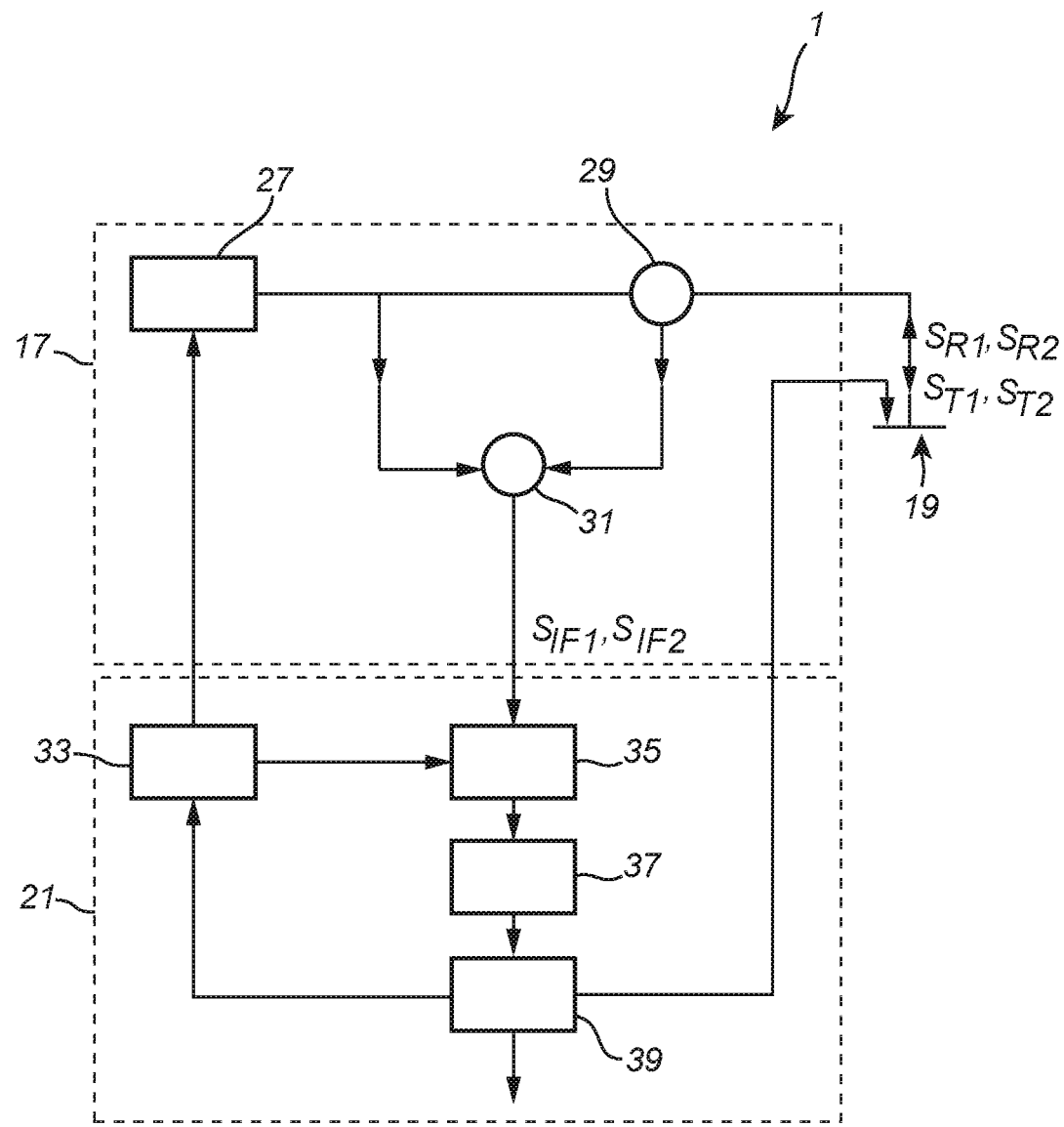
FIG. 3 is a schematic block diagram of the transceiver and measurement processor comprised in a radar level gauge system according to an embodiment of the present invention.

FIG. 3 is a partial and simplified schematic block diagram of the radar level gauge system 1 in FIG. 2. Referring to FIG. 2, the block diagram shows a measurement channel comprising the transceiver 17, the signal propagation arrangement 19, and the processing circuitry 21 in FIG. 2.

The transceiver 17 is here shown as including a microwave source 27, a power divider 29, and a mixer 31. The processing circuitry 21 is shown as including timing circuitry 33, a sampler 35, an FFT block 37, and a processing and control block 39.

As is schematically indicated in FIG. 3, the timing circuitry 33 is coupled to the microwave source 27 to control the microwave source 27 to generate a transmit signal $S_T$. The microwave source 27 is connected to the antenna 19 via the power divider 29, and thus provides the transmit signals $S_{T1}$, $S_{T2}$ to the antenna 19. The reflection signals $S_{R1}$, $S_{R2}$ from the antenna 19 are routed by the power divider 29 to the mixer 31, which is also connected to receive the signal from the microwave source 27. The transmit signals $S_{T1}$, $S_{T2}$ provided by the microwave source 27 and the reflection signals $S_{R1}$, $S_{R2}$ from the antenna 19 are combined to form respective intermediate frequency signals $S_{IF1}$, $S_{IF2}$.

As is schematically shown in FIG. 3, the intermediate frequency signals $S_{IF1}$, $S_{IF2}$ are sampled by the sampler 35, which may be controlled by the timing circuitry 33 to be synchronized with the respective transmit signal $S_{T1}$, $S_{T2}$. The sampled intermediate frequency signals $S_{IF1}$, $S_{IF2}$ are further processed by the FFT-block 37. The processing and control block 39 controls operation of the radar level gauge system 1, including operation of the timing circuitry 33, and the signal propagation arrangement 19. For example, the processing and control block 39 may control the signal propagation arrangement 19, here patch antenna, to vary the direction of propagation of the transmit signals provided to the signal propagation arrangement 19. Furthermore, the processing and control block 39 may analyze the sampled and frequency transformed intermediate frequency signals $S_{IF1}$, $S_{IF2}$ to determine the filling level and/or verify the operation of the radar level gauge system 1.

While the elements of the transceiver 17 are typically implemented in hardware, and form part of an integrated unit normally referred to as a microwave unit, at least some portions of the processing circuitry 21 may typically be embodied by software modules executed by an embedded processor. The invention is not restricted to this particular realization, and any implementation found suitable to realize the herein described functionality may be contemplated.

An example embodiment of the method according to the first aspect of the present invention will now be described with reference to the flow-chart in FIG. 4. In a first step 100, the first transmit signal $S_{T1}$ is generated and transmitted. The reflection signal $S_{R1}$ resulting from reflection of the first transmit signal $S_{T1}$ at the corner reflector 16 is received in step 101.

Figure 5:
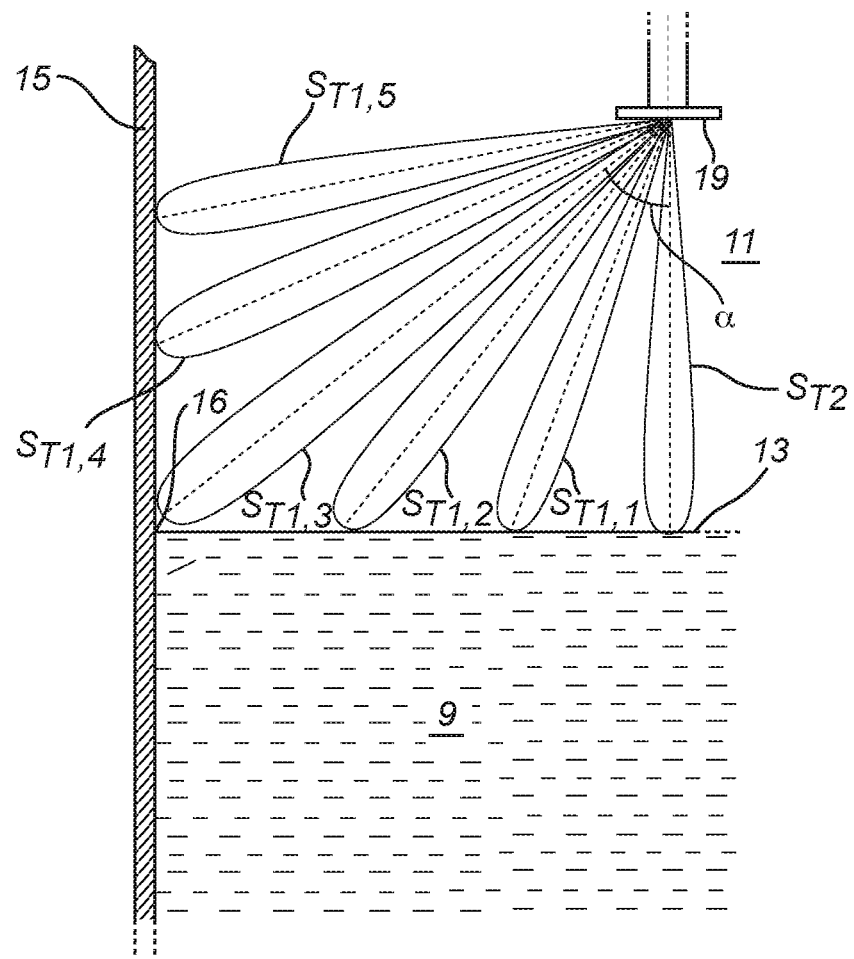
FIG. 5 is a schematic illustration of how the corner reflector can be located by scanning the propagation direction of the first transmit signal.

It is now briefly referred to FIG. 5, which is a schematic illustration of how the corner reflector 16 can be located by scanning the propagation direction of the first transmit signal $S_{T1}$. As is indicated in FIG. 5, the signal propagation arrangement 19 may be controlled to propagate first transmit signals $S_{T1,1}$-$S_{T1,5}$ in a number of different directions. The first transmit signals $S_{T1,1}$-$S_{T1,5}$ may be transmitted in sequence using the same antenna 19, or, depending on the capabilities of the transceiver 17 and the signal propagation arrangement 19, the first transmit signals $S_{T1,1}$-$S_{T1,5}$ may be radiated simultaneously. As can be understood from the schematic illustration in FIG. 5, only one of the first transmit signals $S_{T1,3}$ will result in a strong reflection at the corner reflector 16. This reflection is the above-mentioned first reflection signal $S_{R1}$. Of course it may be feasible and often desirable to propagate a larger number of first transmit signals, and/or with a smaller direction increment, in particular in the vicinity of the direction to the corner reflector 16.

Returning to FIG. 4, the second transmit signal $S_{T2}$ is generated and transmitted in step 102. The reflection signal $S_{R2}$ resulting from reflection of the second transmit signal $S_{T2}$ at the surface 13 of the product 9 is received in step 103. Referring again briefly to FIG. 5, the second transmit signal $S_{T2}$ is propagated vertically towards the surface 13 of the product 9.

Alternatively, or in combination with the angular scanning process described above in connection with step 101, the direction from the radar level gauge system 1 to the corner reflector 16 may be estimated based on a previous (recent) filling level determination (measurement of the vertical distance A to the surface 13) Based on an at least approximal estimation of the vertical distance A and the known horizontal distance B, the direction to the corner reflector 16 can be estimated, and this estimation may be used to define a narrow scanning range. For example, the second transmit signal $S_{T2}$ may be transmitted, the second reflection signal $S_{R2}$ may be received, and an approximate vertical distance to the surface 13 of the product 9 may be determined before the first transmit signal $S_{T1}$ is propagated. This alternative or supplementary procedure is equally relevant to all aspects of the present invention.

In the subsequent step 104 a signal speed compensation factor is determined, that is specific to the tank atmosphere 11. The compensation factor is determined based on a first timing relation between the first transmit signal $S_{T1}$ and the first reflection signal $S_{R1}$, a second timing relation between the second transmit signal $S_{T2}$ and the second reflection signal $S_{R2}$, and the known horizontal distance B between the radar level gauge system 1 and the corner reflector 16.

The above-mentioned first timing relation may, for example, be embodied by a first intermediate frequency signal $S_{IF1}$, and the second timing relation may for example be embodied by a second intermediate frequency signal $S_{IF2}$. Based on the first intermediate frequency signal $S_{IF1}$, the measured distance C' between the reference position at the radar level gauge system 1 and the corner reflector 16 may be determined under the assumption that signal propagation takes place in air, and based on the second intermediate frequency signal $S_{IF2}$, the measured distance A' in the vertical direction between the reference position at the radar level gauge system 1 and the surface 13 of the product 9.

Due to the geometry of the measurement configuration in FIG. 1, the actual distances A, C relate to the known horizontal distance B according to the following relation:

$$B=\sqrt{C^2-A^2}.$$

If the tank atmosphere 11 were constituted by air, the same relation would be valid for the measured distances A', C'. When the tank atmosphere 11 is not constituted by air, but contains hydrocarbon vapor etc, the signal speed will typically be decreased, resulting in a longer time-of-flight, so that the measured distances A' and C' will appear longer than they actually are.

A signal propagation speed compensation factor for compensating for this effect can thus be obtained from the following relation:

$$k = \sqrt{\frac{\varepsilon_{real}}{\varepsilon_{cal}}} = \frac{\sqrt{C'^2 - A'^2}}{B},$$

where $\varepsilon_{real}$ is the actual average dielectric constant of the tank atmosphere and $\varepsilon_{cal}$ is the dielectric constant used during factory calibration (typically the dielectric constant of air).

Finally, in step 105, the filling level L is determined based on the measured vertical distance A', the compensation factor k, and the known dimensions of the tank 3. In particular, the true vertical distance A can be determined as A'/k. The true vertical distance A can then be used in a per se well-known manner to determine the filling level L.

Figure 6:
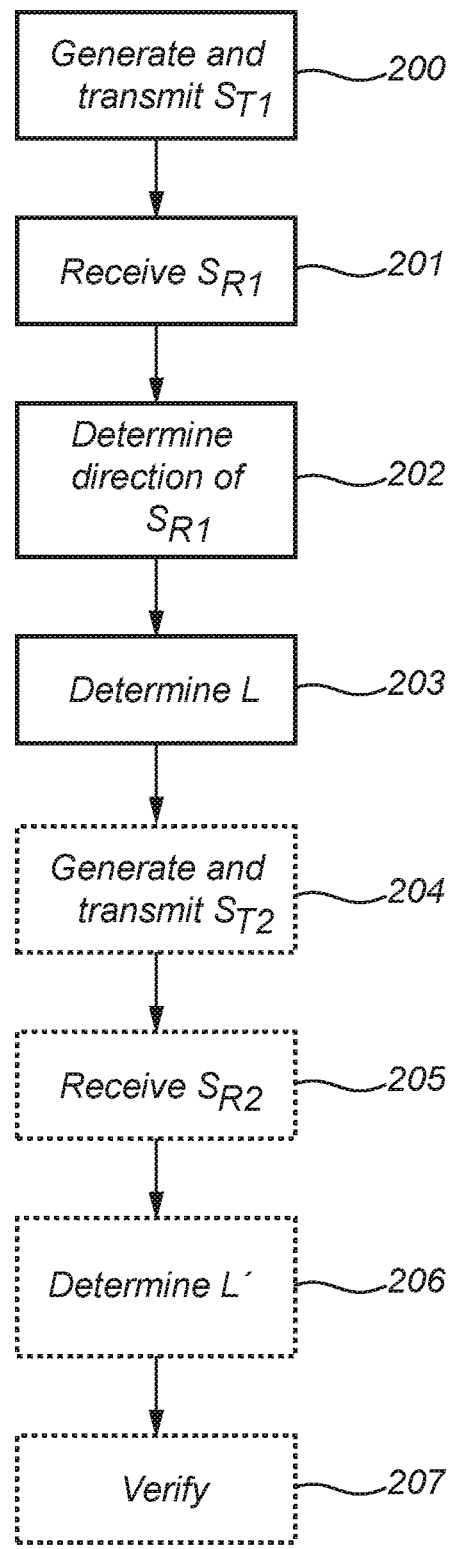
FIG. 6 is a flow-chart schematically illustrating example embodiments of the method according to the third aspect of the present invention.

Example embodiments of the method according to the third aspect of the present invention will now be described with reference to the flow-chart in FIG. 6.

Figure 4:
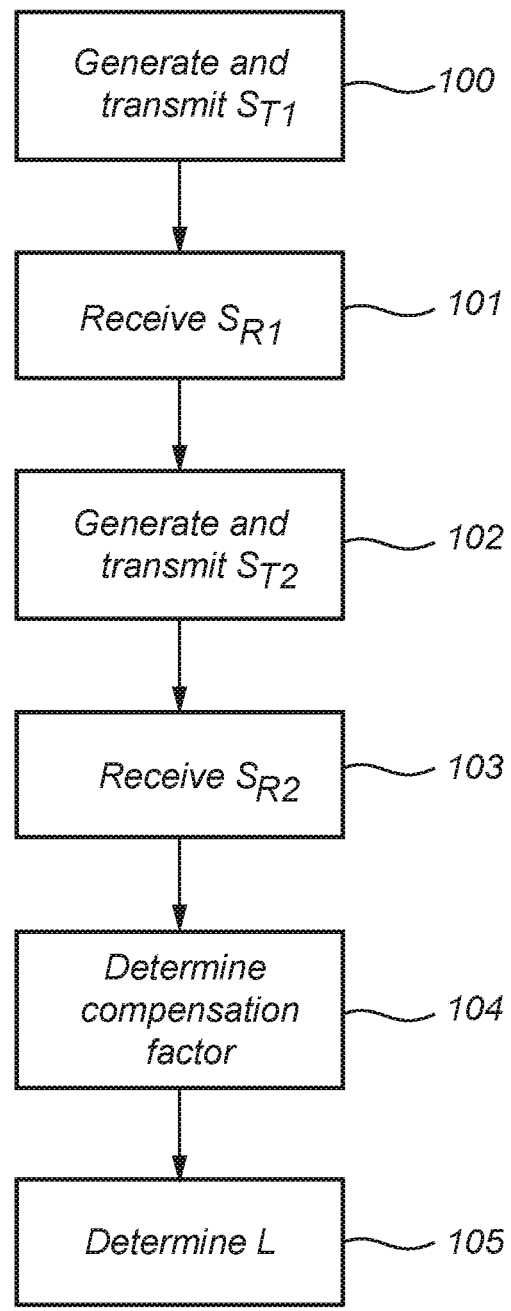
FIG. 4 is a flow-chart schematically illustrating example embodiments of the method according to the first aspect of the present invention.

In the first steps 200 and 201, the first transmit signal $S_{T1}$ is generated and transmitted, and the first reflection signal $S_{R1}$ is received as described above in relation to the first steps 100 and 101 of the method in FIG. 4.

In the subsequent step 202, a measure indicative of the direction of the first reflection signal $S_{R1}$ is determined. For instance, several first transmit signals $S_{T1,1}$-$S_{T1,5}$ may be propagated in different directions, and the direction of the first transmit signal $S_{T1,3}$ resulting in the strongest first reflection signal $S_{R1}$ may be taken to correspond to the direction of the first reflection signal $S_{R1}$. The direction of the first reflection signal $S_{R1}$ may, for example, be represented by the angle α in relation to a vertical line passing through the reference position at the radar level gauge system 1, such as a symmetry line through the antenna 19. This angle α is indicated in FIG. 1 and FIG. 5.

Based on this angle α and the known horizontal distance B, the vertical distance A to the surface 13 of the product 9 can be determined according to:

$$A=B \cot \alpha.$$

Obviously, a high-precision determination of the vertical distance A requires at least a high-precision determination of the direction (represented by the angle α). This may, for example, be achieved by first carrying out a coarse direction sweep, such as is schematically indicated in FIG. 5, in order to find an approximate direction to the corner reflector 16, and then carrying out a fine direction sweep around this approximate direction. It may also be advantageous to configure the antenna 19 for a narrow antenna lobe, at least in the cross-section with a vertical plane (the illustrative and exaggerated lobe width indicated in FIG. 5 is the cross-section with a vertical plane).

The filling level L is determined based on the vertical distance A and known dimensions of the tank 3 in step 203.

Optionally, the method may proceed through steps 204 to 207 in order to verify operation of the radar level gauge system 1.

In step 204, a second transmit signal $S_{T2}$ is generated and transmitted. The reflection signal $S_{R2}$ resulting from reflection of the second transmit signal $S_{T2}$ at the surface 13 of the product 9 is received in step 205. Referring again briefly to FIG. 5, the second transmit signal $S_{T2}$ is propagated vertically towards the surface 13 of the product 9. In step 206, an uncompensated filling level measure L' is determined based on a timing relation between the second transmit signal $S_{T2}$ and the second reflection signal $S_{R2}$.

Finally, in step 207, the operation of the radar level gauge system 1 is verified based on a comparison between the filling level L determined in step 203 based on the determination of the direction of the first reflection signal $S_{R1}$ and the filling level L' determined in step 206. If the comparison indicates that the two measurements of the filling level differ considerably more than can be expected based on known measurement tolerances and predicted approximate signal propagation delay in the tank atmosphere 11, a signal may be provided from the radar level gauge system 1 indicating that proper operation could not be verified. The operator can then take appropriate action to carry out a more thorough check of the functionality of the radar level gauge system 1.

The person skilled in the art realizes that the present invention by no means is limited to the preferred embodiments described above. On the contrary, many modifications and variations are possible within the scope of the appended claims.

What is claimed is:

1. A method of determining a signal propagation speed compensation factor in a tank using a radar level gauge system, the tank having a tank wall, and a tank atmosphere above a surface of a product in the tank, wherein the method comprises:
    generating and transmitting an electromagnetic first transmit signal;
    propagating the first transmit signal through the tank atmosphere towards a corner reflector formed by the surface of the product and the tank wall where the surface of the product meets the tank wall, the corner reflector being at a known horizontal distance from the radar level gauge system;
    receiving an electromagnetic first reflection signal resulting from reflection of the first transmit signal at the corner reflector;
    generating and transmitting an electromagnetic second transmit signal;
    propagating the second transmit signal through the tank atmosphere vertically towards the surface of the product;
    receiving an electromagnetic second reflection signal resulting from reflection of the second transmit signal at the surface of the product; and
    determining the signal propagation speed compensation factor based on a first timing relation between the first transmit signal and the first reflection signal, a second timing relation between the second transmit signal and the second reflection signal, and the known horizontal distance between the radar level gauge system and the corner reflector.

2. The method according to claim 1, wherein the method further comprises:
    determining a filling level of the product in the tank based on the second timing relation between the second transmit signal and the second reflection signal, and the signal propagation speed compensation factor.

3. The method according to claim 1, wherein the first transmit signal is propagated in a plurality of directions in relation to a line normal to the surface of the product.

4. The method according to claim 1, wherein the first transmit signal is one of a plurality of transmit signals propagated in the plurality of directions.

5. A radar level gauge system for determining a filling level of a product in a tank having a tank wall, and a tank atmosphere above a surface of a product in the tank, wherein the radar level gauge system comprises:
    a transceiver for generating, transmitting and receiving electromagnetic signals;
    a signal propagation arrangement coupled to the transceiver for:
        propagating an electromagnetic first transmit signal through the tank atmosphere towards a corner reflector formed by the surface of the product and the tank wall where the surface of the product meets the tank wall, the corner reflector being at a known horizontal distance from the radar level gauge system, and returning to the transceiver an electromagnetic first reflection signal resulting from reflection of the first transmit signal at the corner reflector; and
        propagating an electromagnetic second transmit signal vertically from the transceiver through the tank atmosphere towards the surface of the product and returning to the transceiver an electromagnetic second reflection signal resulting from reflection of the second transmit signal at the surface of the product; and
    processing circuitry coupled to the transceiver and configured to determine the filling level based on a first timing relation between the first transmit signal and the first reflection signal, a second timing relation between the second transmit signal and the second reflection signal, and the known horizontal distance between the radar level gauge system and the corner reflector.

6. The radar level gauge system according to claim 5, wherein the signal propagation arrangement comprises a radiating antenna configured to propagate the first transmit signal in a plurality of directions in relation to a line normal to the surface of the product.

7. The radar level gauge system according to claim 6, wherein the radiating antenna is controllable to successively propagate transmit signals in each direction in the plurality of directions.

* * * * *